United States Patent
Yoshikawa

(10) Patent No.: US 10,294,030 B2
(45) Date of Patent: May 21, 2019

(54) DEW CONDENSATION PREVENTION DEVICE FOR DISCHARGE CHUTE, AND PARTICULATE FEEDING DEVICE USING SAME

(71) Applicant: YOSHIKAWA CORPORATION, Satsumasendai-shi, Kagoshima (JP)

(72) Inventor: Osamu Yoshikawa, Satsumasendai (JP)

(73) Assignee: YOSHIKAWA CORPORATION, Satsumasendai-shi, Kagoshima (JP)

(*) Notice: Subject to any disclaimer, the term of this patent is extended or adjusted under 35 U.S.C. 154(b) by 0 days.

(21) Appl. No.: 15/744,257

(22) PCT Filed: Nov. 18, 2016

(86) PCT No.: PCT/JP2016/084260
§ 371 (c)(1),
(2) Date: Jan. 12, 2018

(87) PCT Pub. No.: WO2017/090525
PCT Pub. Date: Jun. 1, 2017

(65) Prior Publication Data
US 2018/0194558 A1    Jul. 12, 2018

(30) Foreign Application Priority Data
Nov. 26, 2015  (JP) ................. 2015-230433

(51) Int. Cl.
*B65G 11/20* (2006.01)
*B65G 65/40* (2006.01)
(Continued)

(52) U.S. Cl.
CPC .............. *B65G 11/20* (2013.01); *B01D 21/01* (2013.01); *B65D 88/26* (2013.01); *B65D 88/70* (2013.01);
(Continued)

(58) Field of Classification Search
CPC ........ B65G 11/20; B65G 69/20; B65G 11/16; B65G 65/40; B65G 65/4836; B65G 11/02;
(Continued)

(56) References Cited

U.S. PATENT DOCUMENTS 2,192,661 A * 3/1940 Jones ...................... F23D 14/54
239/424
2,924,487 A * 2/1960 Stambera ............... B65D 88/72
406/91
(Continued)

FOREIGN PATENT DOCUMENTS

JP    6-80190 A    3/1994
JP    6-51509 B2   7/1994
(Continued)

*Primary Examiner* — David P Angwin
*Assistant Examiner* — Bob Zadeh
(74) *Attorney, Agent, or Firm* — Novick, Kim & Lee, PLLC; Jae Youn Kim

(57) ABSTRACT

Provided is a dew condensation prevention device for a discharge chute. A tip end portion of the discharge chute has inverted truncated cone-shaped internal and external chutes, a space is provided between an outer surface of the internal chute and an inner surface of the external chute, and a first air discharge port that communicates with the space is provided between respective lower ends of the two chutes. A cylindrical portion having an air reservoir in the interior thereof is provided to surround an outer peripheral surface of the external chute, and by providing an opening between an inner peripheral edge of a lower surface of the cylindrical portion and the outer peripheral surface of the external chute, a second air discharge port that communicates with the air reservoir is provided. Air input pipes for introduction of dry air are connected to the external chute and the cylindrical portion, respectively.

12 Claims, 7 Drawing Sheets

(51) Int. Cl.
  *B65D 88/26* (2006.01)
  *B65D 88/70* (2006.01)
  *B01D 21/01* (2006.01)
  *B65G 11/16* (2006.01)
  *B65G 69/20* (2006.01)
  *B65G 11/02* (2006.01)
  *C02F 1/52* (2006.01)
  *B65G 65/48* (2006.01)

(52) U.S. Cl.
  CPC .............. *B65G 11/16* (2013.01); *B65G 65/40* (2013.01); *B65G 69/20* (2013.01); *B65G 11/02* (2013.01); *B65G 65/4836* (2013.01); *C02F 1/52* (2013.01); *C02F 1/5281* (2013.01)

(58) Field of Classification Search
  CPC ........ B01D 21/01; B65D 88/70; B65D 88/26; C02F 1/5281; C02F 1/52
  See application file for complete search history.

(56) References Cited

U.S. PATENT DOCUMENTS

| | | | | |
|---|---|---|---|---|
| 3,305,142 A | * | 2/1967 | Caldwell | B65D 88/72 222/195 |
| 3,348,589 A | * | 10/1967 | Werner | B65D 88/72 141/231 |
| 4,743,734 A | * | 5/1988 | Garlanov | B23K 9/29 219/121.48 |
| 5,704,554 A | * | 1/1998 | Cooper | B05B 5/03 239/690.1 |
| 5,765,761 A | * | 6/1998 | Law | B05B 5/03 239/690.1 |
| 5,958,522 A | * | 9/1999 | Nakagawa | C23C 4/08 427/455 |
| 2005/0272347 A1 | * | 12/2005 | Spalteholz | B24C 1/003 451/7 |
| 2011/0108528 A1 | * | 5/2011 | Laurisch | H05H 1/34 219/121.5 |
| 2013/0341427 A1 | * | 12/2013 | Ukawa | B08B 7/0092 239/290 |
| 2016/0161135 A1 | * | 6/2016 | Kikuchi | G01G 19/393 177/245 |
| 2018/0194558 A1 | * | 7/2018 | Yoshikawa | B65G 65/40 |

FOREIGN PATENT DOCUMENTS

| | | |
|---|---|---|
| JP | 2002-059037 A | 2/2002 |
| JP | 2005-263468 A | 9/2005 |
| JP | 2011-255903 A | 12/2011 |
| JP | 2012-91156 A | 5/2012 |
| JP | 2012-091156 A | 5/2012 |
| JP | 2013-253756 | 12/2013 |
| JP | 2015-202930 A | 11/2015 |

* cited by examiner

DEW CONDENSATION PREVENTION DEVICE FOR DISCHARGE CHUTE, AND PARTICULATE FEEDING DEVICE USING SAME

TECHNICAL FIELD

This invention relates to a dew condensation prevention device for a discharge chute of a particulate feeder, which can prevent dew condensation from forming in the vicinity of the discharge chute and raw material from sticking to the vicinity of the discharge chute due to moisture absorption and so on, and to a particulate feeding device employing the dew condensation prevention device.

BACKGROUND ART

In a conventional device, a particulate feeder for feeding a powder flocculant (particulate) is disposed in an upper portion of a dissolving tank, the flocculant is fed downward into the dissolving tank through a discharge chute, and by agitating water in the dissolving tank, the flocculant is dissolved into the water (Patent Document 1).

Due to high humidity and so on in the vicinity of the discharge chute in this type of powder flocculant dissolving device, dew condensation forms easily in the vicinity of the discharge chute. Moreover, water droplets may splash up from the dissolving tank and stick to a lower end portion of the discharge chute such that the flocculant forms lumps that stick to the vicinity of the lower end portion of the discharge chute.

In a device proposed in response to this problem, the discharge chute is provided with a duplex structure, air is fed into a space in the interior of the discharge chute, and the air is ejected from a tip end of the discharge chute. In so doing, dew condensation water is prevented from remaining on the tip end portion of the discharge chute, flocculant raw material is prevented from sticking, and so on (Patent Document 2).

CITATION LIST

Patent Literature

[Patent Document 1] Japanese Patent Application Publication No. 2012-91156
[Patent Document 2] Japanese Patent Application Publication No. 2011-255903

SUMMARY OF INVENTION

Technical Problem

With the device of Patent Document 2, raw material can be prevented from sticking in a direction heading into the interior of the discharge chute from the tip end portion of the chute, but the raw material may also form lumps that stick to an outer peripheral portion of the tip end portion of the discharge chute, and therefore demand exists for a discharge chute that can effectively prevent raw material from sticking in this manner.

Further, in a case where hygroscopic, deliquescent particulate is stored and fed, a phenomenon whereby the particulate takes in moisture from the air and forms lumps occurs not only in the chute portion, but also in the particulate feeder and/or a particulate storage portion (a hopper). It is therefore desirable to suppress moisture absorption by the particulate not only in the chute portion, but also in the feeding portion and/or the storage portion.

This invention has been designed in consideration of the conventional problems described above, and an object thereof is to provide a dew condensation prevention device for a discharge chute of a particulate feeding device, which can prevent, for example, dew condensation from forming in the vicinity of the discharge chute and raw material (particulate or the like) from sticking to the vicinity of the discharge chute due to moisture absorption and so on.

Another object of this invention is to provide a particulate feeding device that employs the dew condensation prevention device for a discharge chute described above, and that can suppress moisture absorption by the particulate in a particulate feeder and/or a particulate storage portion (a hopper) and so on.

Solution to Problem

To achieve the objects described above, this invention is constituted by (1) a dew condensation prevention device for a discharge chute provided in a discharge port of a particulate feeder, wherein: a tip end portion of the discharge chute has a duplex configuration including inverted truncated cone-shaped internal and external chutes; a space is provided between an outer surface of the internal chute and an inner surface of the external chute, and a first air discharge port that communicates with the space is provided between respective lower ends of the two chutes; a cylindrical portion having an air reservoir in the interior thereof is provided to surround an outer peripheral surface of the external chute, and by providing an opening between an inner peripheral edge of a lower surface of the cylindrical portion and the outer peripheral surface of the external chute in a slightly higher position than the lower end of the external chute, a second air discharge port that communicates with the air reservoir is provided; and an external chute air input pipe and a cylindrical portion air input pipe for introducing dry air into the space and the air reservoir, respectively, are connected respectively to the outer peripheral surface of the external chute and the outer peripheral surface of the cylindrical portion.

According to this configuration, dry air is ejected downward through the first air discharge port in the lower end portion of the discharge chute as particulate falls through the discharge chute, making it possible to effectively prevent dew condensation from forming in the vicinity of the lower end portion of the discharge chute and lumps of particulate material formed when the particulate material absorbs moisture from sticking to the lower end portion of the discharge chute.

Moreover, the dry air is ejected downward through the second air discharge port from a slightly higher position than the lower end of the external chute, making it possible to effectively prevent dew condensation from forming on and lumps of particulate from sticking to the outer peripheral portion of the lower end of the external chute.

Further, this invention is constituted by (2) the dew condensation prevention device for a discharge chute according to (1), wherein the lower end of the internal chute is formed to be slightly shorter than the lower end of the external chute, and the second air discharge port is positioned on an upper side of a lower end position of the internal chute.

According to this configuration, lumps of particulate forming on the lower ends of the internal and external chutes can be removed effectively by the dry air ejected downward through the first air discharge port. Moreover, the dry air ejected downward through the second air discharge port can effectively prevent dew condensation from forming on or lumps of particulate from sticking to the outer peripheral surface of the lower end portion of the external chute.

Further, this invention is constituted by (3) a particulate feeding device employing the dew condensation prevention device for a discharge chute according to (1) or (2), wherein: the particulate feeder is configured by providing an outer tube on a bottom plate, providing an inner tube that shares a central axis with the outer tube such that a lower end thereof is positioned a predetermined distance above the bottom plate, and closing an upper end of the outer tube and an outer surface of the inner tube by using an annular plate; a plurality of rotary blades extending over the bottom plate are provided about the central axis such that a tip end portion of each of the rotary blades is close to an inner surface of the outer tube; particulate fed into the inner tube flows out into an annular passage formed between the inner and outer tubes; by rotating the rotary blades, the particulate in the annular passage can be conveyed by the rotary blades to the discharge port that is provided in the bottom plate; and an outer tube air input pipe for introducing the dry air into the annular passage is connected to an outer peripheral surface of the outer tube.

According to this configuration, by introducing the dry air into the annular passage through the air input pipe for the outer tube of the particulate feeder, the interior of the annular passage can be maintained in a dry state at all times.

As a result, the formation of lumps of particulate resulting from moisture absorption by the particulate in the annular passage can be effectively suppressed. Furthermore, the dry air introduced into the annular passage passes through the discharge chute from the discharge port of the annular passage, and is discharged to the outside from the lower end of the discharge chute. As a result, the interior of the discharge chute can be maintained in a dry state, whereby the occurrence of dew condensation forming in the inner peripheral portion near the lower end of the discharge chute or lumps of particulate sticking to the inner peripheral portion can be effectively suppressed.

Further, this invention is constituted by (4) the particulate feeding device according to (3), wherein a hopper that can store the particulate is connected to an upper portion of the inner tube, and a hopper air input pipe for introducing the dry air into the hopper is connected to an outer peripheral surface of an upper portion of the hopper.

According to this configuration, by introducing the dry air into the hopper, the interior of the hopper can be maintained in a dry state, whereby lumps of particulate formed in the hopper when the particulate absorbs moisture and so on can be effectively prevented from sticking to the hopper inner surface, for example.

Further, this invention is constituted by (5) the particulate feeding device according to (4), wherein pipes connected respectively to the external chute air input pipe, the cylindrical portion air input pipe, the outer tube air input pipe, and the hopper air input pipe are provided, and the dry air is fed to the pipes via a compressor.

According to this configuration, the dry air can be fed into the space in the external chute, the air reservoir in the cylindrical portion, the annular passage, and the hopper using shared pipes, and therefore a pipe configuration can be simplified such that the formation of dew condensation and lumps of particulate resulting from water or moisture absorption by the particulate can be prevented effectively by means of a simple configuration.

Further, this invention is constituted by (6) the particulate feeding device according to any one of (3) to (5), wherein the particulate feeding device is fixed onto an upper surface plate of a dissolving tank of a flocculant dissolving device, an opening in a lower end of the discharge chute is disposed so as to be oriented downward toward a liquid in the dissolving tank, and a flocculant serving as the particulate is fed downward toward the liquid in the dissolving tank through the discharge port.

According to this configuration, a particulate feeding device that can effectively suppress the formation of dew condensation and lumps of flocculant can be realized in a flocculant dissolving device, in which the humidity is high so that dew condensation and lumps of flocculant form easily.

Advantageous Effects of Invention

According to this invention, dew condensation can be effectively prevented from forming in the vicinity of the lower end portion of the discharge chute, and lumps of particulate material formed when the particulate material absorbs moisture can be effectively prevented from sticking to the lower end portion of the discharge chute. Further, the dry air is ejected downward through the second air discharge port from a slightly higher position than the lower end of the external chute, making it possible to effectively prevent dew condensation from forming on and lumps of particulate from sticking to the outer peripheral portion of the lower end of the external chute.

Furthermore, lumps of particulate forming on the lower ends of the internal and external chutes can be removed effectively by the dry air ejected downward through the first air discharge port. Moreover, the dry air ejected downward through the second air discharge port can effectively prevent dew condensation from forming on and lumps of particulate from sticking to the outer peripheral surface of the lower end portion of the external chute.

Further, by introducing the dry air into the particulate feeder, the interior of the annular passage can be maintained in a dry state at all times, thereby effectively suppressing the formation of lumps of particulate resulting from moisture absorption by the particulate in the annular passage. Furthermore, the dry air introduced into the annular passage is discharged to the outside from the discharge port via the discharge chute lower end, and therefore the interior of the discharge chute can be maintained in a dry state, whereby the formation of dew condensation or lumps of particulate in the inner peripheral portion near the lower end of the discharge chute can be effectively suppressed.

Moreover, by introducing the dry air into the hopper, lumps of particulate formed in the hopper when the particulate absorbs moisture and so on can be effectively prevented from sticking to the hopper inner surface, for example.

Further, the dry air can be fed into the space in the external chute, the air reservoir in the cylindrical portion, the annular passage, and the hopper using shared pipes, and therefore a pipe configuration can be simplified such that the formation of dew condensation and lumps of particulate resulting from water or moisture absorption by the particulate can be prevented by means of a simple configuration.

Furthermore, a particulate feeding device that can effectively suppress the formation of dew condensation and lumps of flocculant can be realized in a flocculant dissolving device, in which the humidity is high such that dew condensation and lumps of flocculant form easily.

DESCRIPTION OF EMBODIMENTS

A dew condensation prevention device for a discharge chute and a particulate feeding device employing the dew condensation prevention device according to this invention will be described in detail below.

Figure 1:
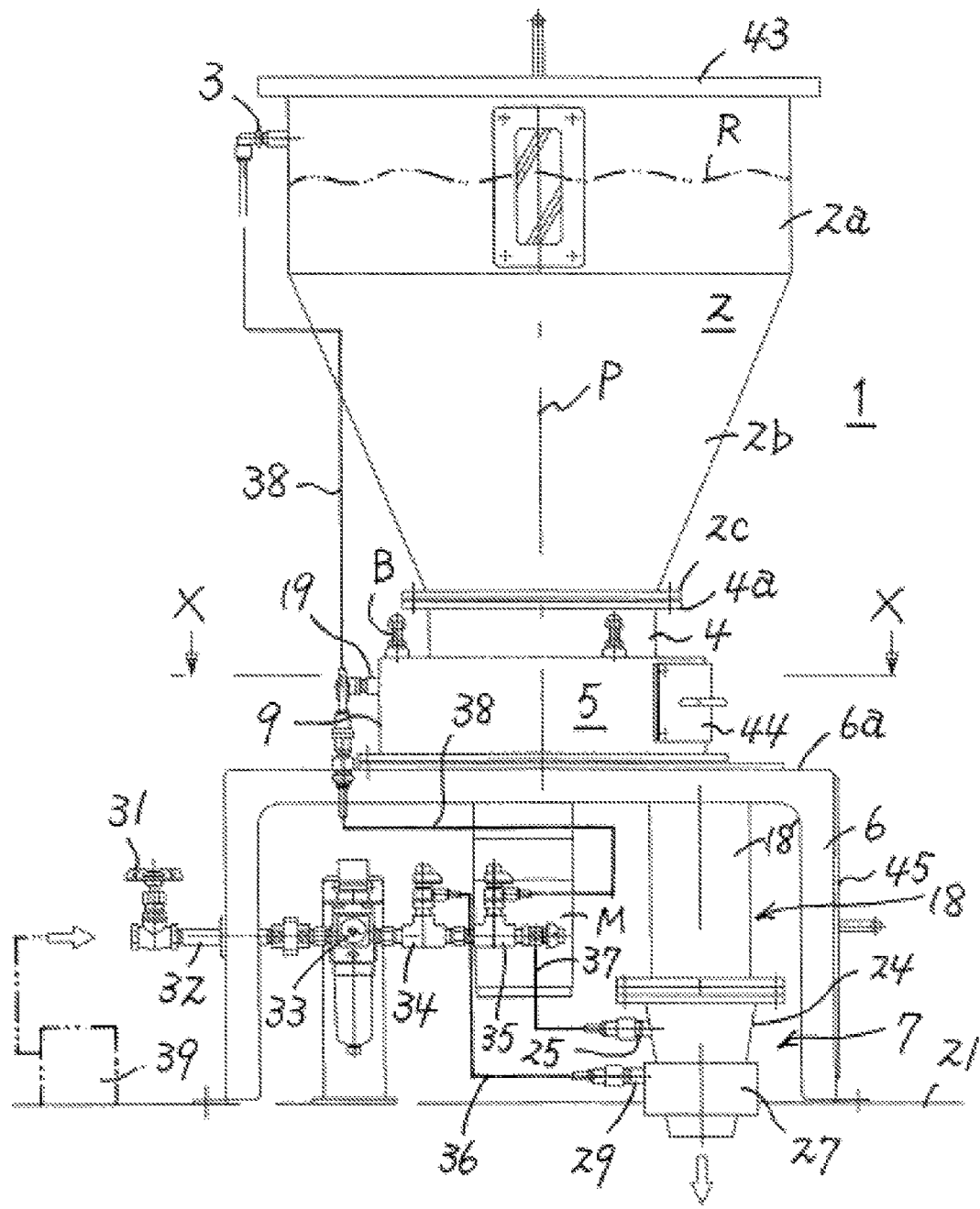
FIG. 1 is a side view of a particulate feeding device employing a dew condensation prevention device for a discharge chute according to this invention.

FIG. 1 shows an overall structure of a particulate feeding device 1 employing the dew condensation prevention device for a discharge chute according to this invention. The overall structure of the particulate feeding device will now be described using this figure.

A hopper 2 houses and stores highly hygroscopic, highly deliquescent particulate R, for example a flocculant. The hopper 2 is constituted by a cylindrical upper tube 2a, and an inverted cone-shaped lower tube 2b connected to a lower portion of the upper tube 2a, and is formed such that the upper tube 2a and the lower tube 2b have a common central axis P. An air input pipe 3 for introducing dry air, to be described below, into the hopper 2 is connected to a side face (an outer peripheral surface) of the upper tube 2a of the hopper 2 so as to penetrate the hopper.

A short tube 4 having an identical central axis to the central axis P is connected to a lower portion flange 2c of the lower tube 2b by an upper portion flange 4a thereof, and a particulate feeder 5 having an identical central axis to the central axis P is connected to the bottom of the short tube 4.

The particulate feeder 5 is fixed horizontally onto an upper surface 6a of a rectangular parallelepiped-shaped housing 6 provided therebelow, and a motor M for driving rotary blades 14 of the particulate feeder 5, a discharge chute 18 of the particulate feeder 5, and pipes 35, 36, 38, and so on for feeding the dry air, to be described below, are disposed and housed in the housing 6.

Figure 8:
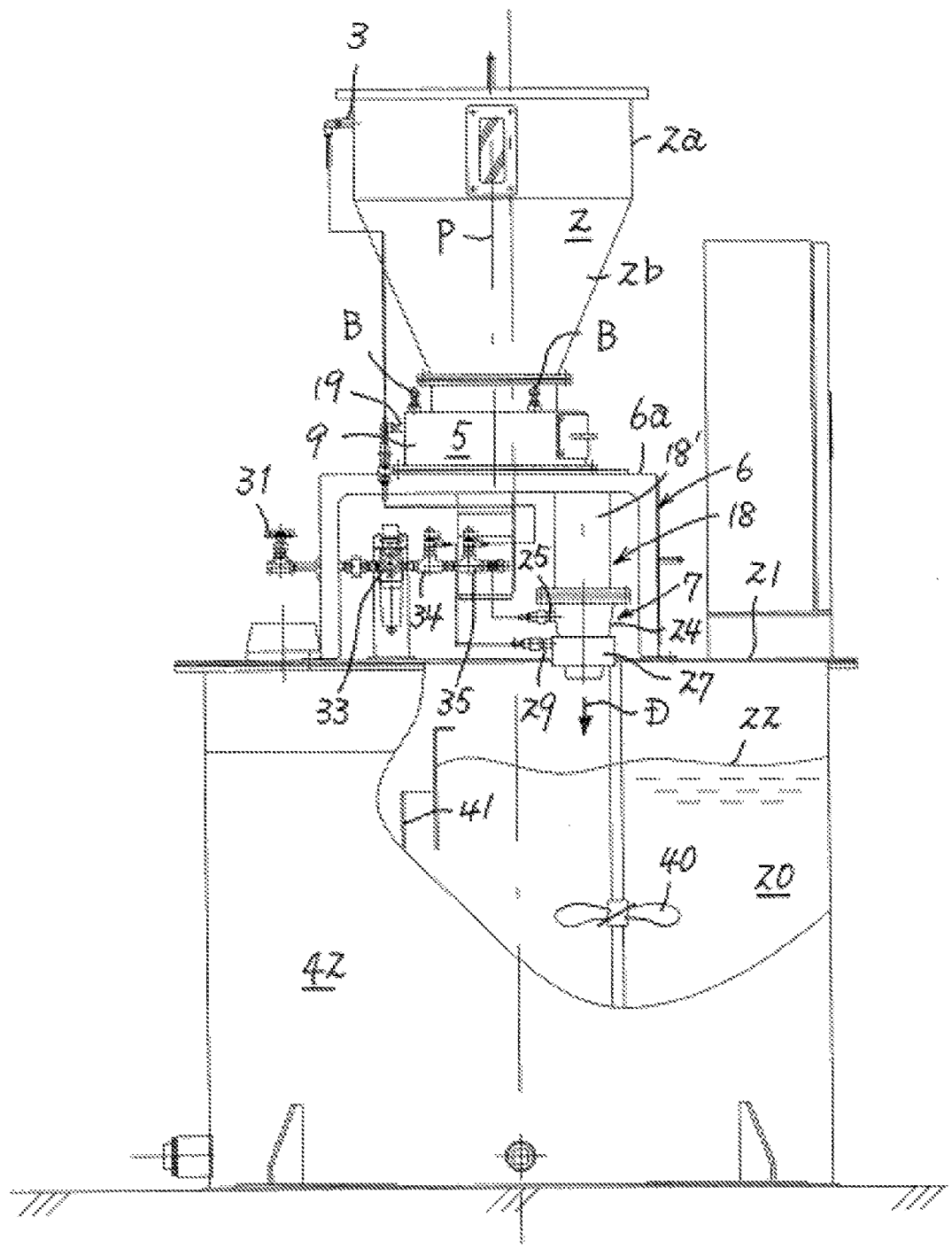
FIG. 8 is a partial sectional side view showing a case in which the particulate feeding device is applied to a flocculant dissolving device.

As shown in FIG. 8, for example, the housing 6 is disposed on an upper surface plate 21 of a dissolving tank 20 for dissolving a powder-form flocculant (a drug) serving as the particulate, and the flocculant is fed downward from the particulate feeder 5 toward agitated water 22 through the discharge chute 18 (in the direction of an arrow D).

Figure 2:
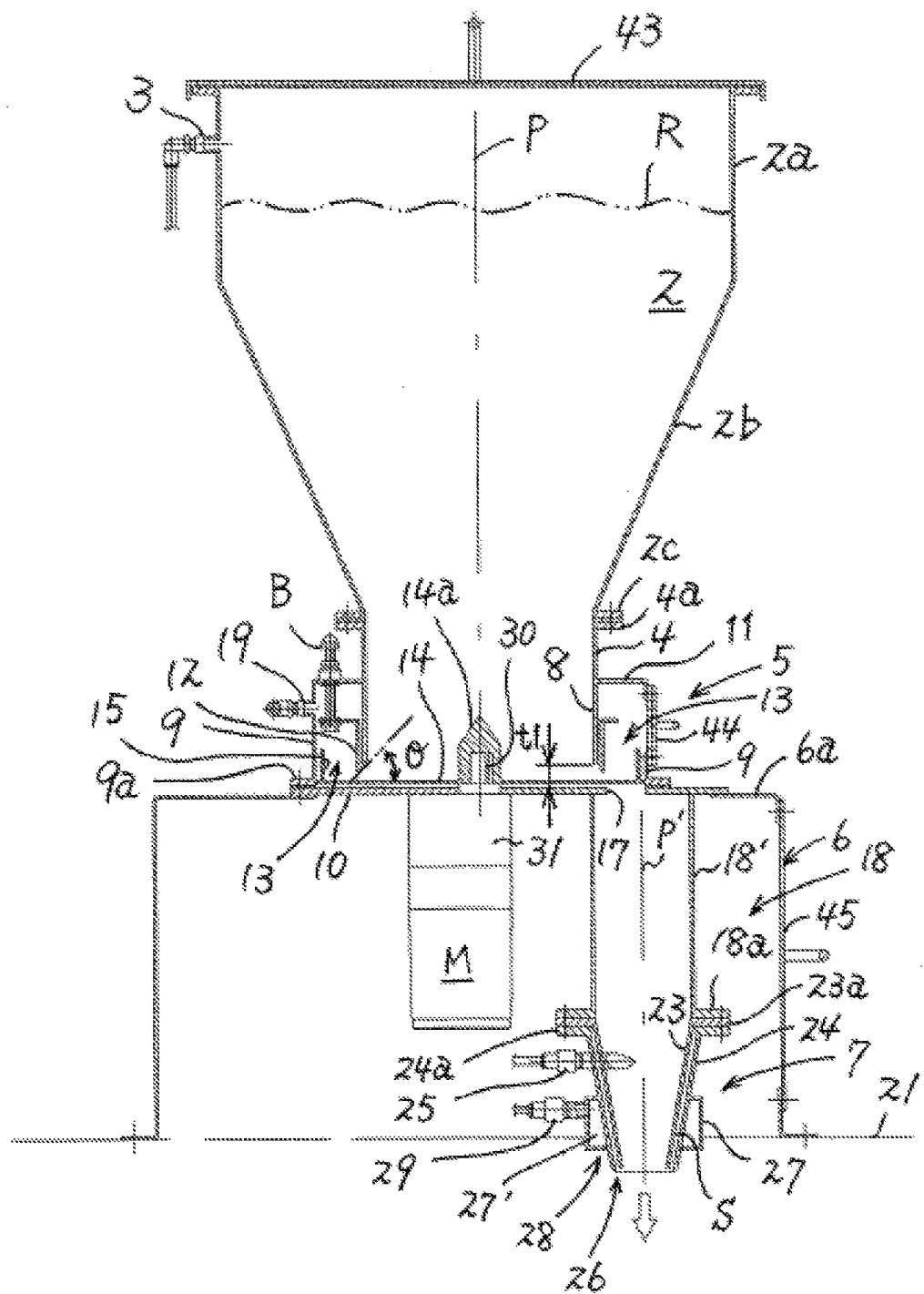
FIG. 2 is a longitudinal sectional view of FIG. 1.
Figure 3:
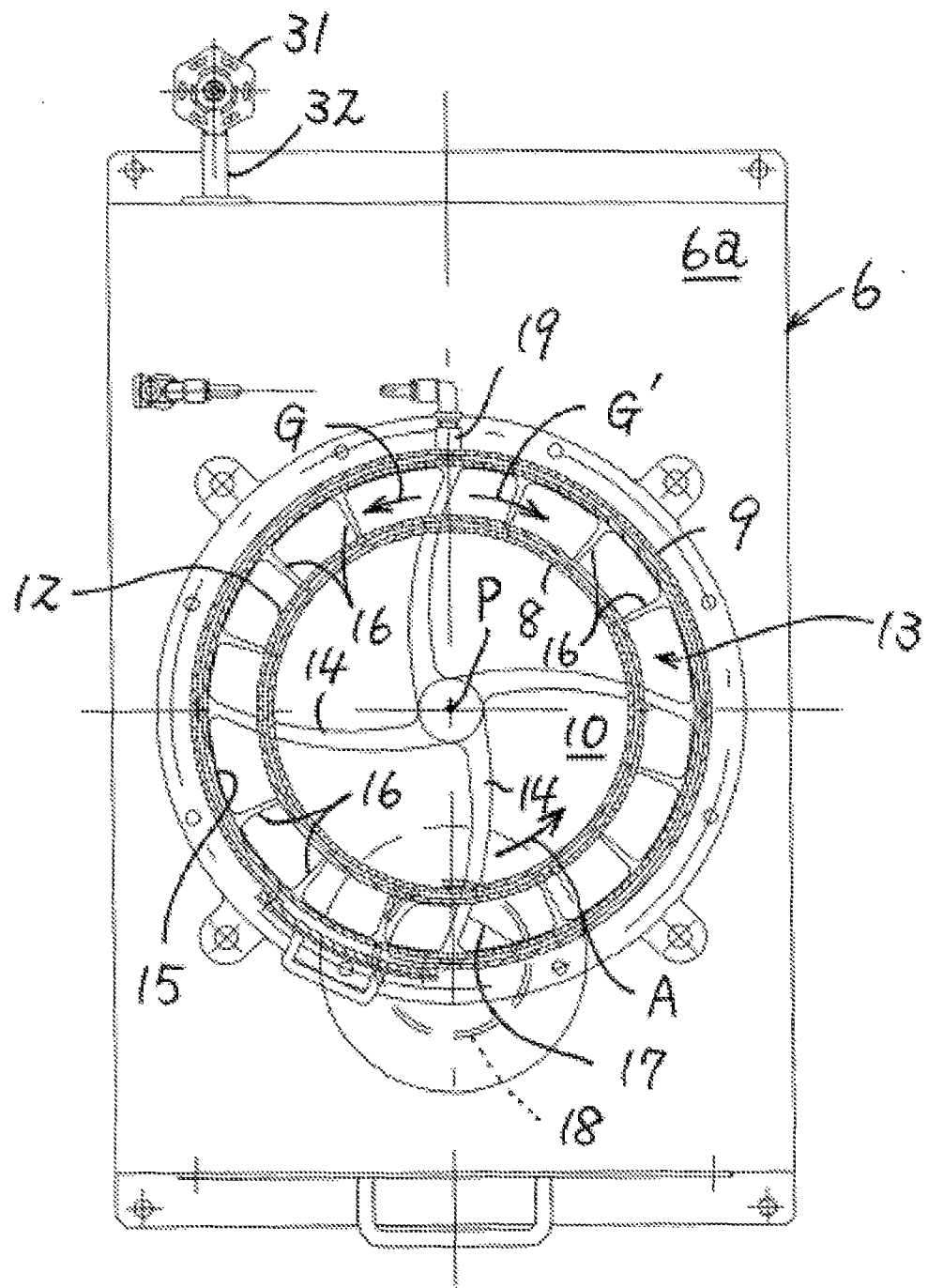
FIG. 3 is an X-X line sectional view of FIG. 1.

As shown in FIGS. 2 and 3, the particulate feeder 5 is fixed by a bottom plate 10 fixed on the upper surface 6a and a lower portion flange 9a fixed on the bottom plate 10. The particulate feeder 5 is constituted by an outer tube 9, an inner tube 8, and an annular plate 11. The outer tube 9 has a larger diameter than the inner tube 8 and shares the central axis P therewith. The inner tube 8 has a smaller diameter than the outer tube 9, and is provided concentrically with the outer tube 9 on the inside thereof such that both the inner tube 8 and the outer tube 9 have the same central axis P. An upper edge of the inner tube 8 is connected to the short tube 4 in a closed state, and has an identical diameter to the short tube 4. The annular plate 11 closes the upper edge of the inner tube 8 and an upper edge of the outer tube 9. With this configuration, an annular passage 13 for the particulate is formed between the outer tube 9 and the inner tube 8.

Further, a tubular adjustment tube 12 is provided on an outer peripheral surface of the inner tube 8 so as to be movable in an up-down direction using an adjustment bolt B inserted from an upper surface side of the annular plate 11. By moving the adjustment tube 12 up and down using the bolt B, an interval t1 between a lower end of the adjustment tube 12 and the bottom plate 10, or in other words an amount of particulate flowing out of the inner tube 8 into the annular passage 13, is adjusted. Hence, the particulate R flows out of the inner tube 8 to the annular passage 13 side at an angle of repose θ corresponding to the interval t1 (see FIG. 2).

The rotary blades 14 are provided to extend radially over the bottom plate 10 about a central rotary shaft 30 provided on the central axis P. The rotary blades 14 are driven to rotate in the direction of an arrow A by the motor M, which is provided on a lower side of the bottom plate 10. Note that a cap 14a is fitted onto the central rotary shaft 30. Further, a reduction gear 31 is connected to the motor M, and the reduction gear 31 is connected to the rotary blades 14.

Tip end portions of the respective rotary blades 14 extend to positions in the vicinity of an inner peripheral surface of the outer tube 9, and a link 15 is fixed to the respective tip end portions. An outer peripheral surface of the link 15 is close to the inner peripheral surface of the outer tube 9.

Furthermore, three pawls 16 are formed between each pair of adjacent rotary blades 14, 14 on an inner side of the link 15 so as to extend from an inner peripheral surface of the link 15 in the direction of the central axis P. The pawls 16 of the link 15 are provided to extend over the bottom plate 10 such that respective tip end portions thereof reach the position of a lower end of the inner tube 8 (see FIG. 3).

Further, a discharge opening (a discharge port) 17 is formed in a part of a plate surface of the bottom plate 10.

Accordingly, the particulate R housed in the hopper 2 is housed in the interior of the inner tube 8 down to the bottom plate 10, and flows out into the annular passage 13 through the interval t1 at the angle of repose θ. When the rotary blades 14 are driven in the direction of the arrow A in this state, the pawls 16 rotate within the annular passage 13 in the direction of the arrow A such that the particulate in the annular passage 13 is conveyed in the direction of the arrow A by the pawls 16 and the rotary blades 14. As a result, the particulate R is fed downward in a fixed amount through the discharge opening 17.

The discharge chute 18, which has a tubular cross-section and a central axis P', is provided in alignment with the discharge opening 17 so as to extend vertically downward into the housing 6 from the lower surface side of the bottom plate 10, and an inverted truncated cone-shaped tip end portion 7 of the discharge chute is formed on a lower end of the chute 18. Note that the cylindrical portion connected to the tip end portion 7 will be referred to as a cylindrical chute 18'.

An air input pipe 19 for feeding dry air into the particulate feeder 5 is provided on a back surface side of the outer tube 9 of the particulate feeder 5, the back surface side being removed from the position of the discharge opening 17 by 180 degrees in a circumferential direction, so as to penetrate the outer tube 9. The air input pipe 19 is provided to be orthogonal to a tangent of the outer peripheral surface of the outer tube 9, whereby air is introduced through the air input pipe 19 in two opposing directions (directions indicated by arrows G and G') traveling around the annular passage 13.

The tip end portion 7 of the discharge chute is configured as follows (see FIGS. 4 to 7).

An upper portion flange 23*a* of an inverted truncated cone-shaped internal chute 23 that shares the central axis P' is connected to a lower side of a lower end flange 18*a* of the cylindrical chute 18'. Further, an upper portion flange 24*a* of an inverted truncated cone-shaped external chute 24 that shares the central axis P' and has a larger diameter than the internal chute 23 on an upper portion (a flange portion) thereof is connected to a lower side of the upper portion flange 23*a*, and the lower end flange 18*a* and the respective upper portion flanges 23*a*, 24*a* are connected fixedly by the bolt B (see FIG. 4). As a result, a circular opening 23' that communicates with the cylindrical chute 18' is formed in the lower end of the internal chute 23.

The internal chute 23 and the external chute 24 have the same central axis P' (which is parallel to the central axis P), while a radius of the upper portion flange 23*a* part (the upper portion) of the internal chute 23 is smaller than a radius of the upper portion flange 24*a* part (the upper portion) of the external chute 24 such that a predetermined space S (an inverted truncated cone-shaped space) is formed between an outer peripheral surface of the internal chute 23 and an inner peripheral surface of the external chute 24. An annular first air discharge port 26 of the annular external chute 24 is formed between respective lower ends of the external chute 24 and the internal chute 23 so as to communicate with the space S.

Figure 4:
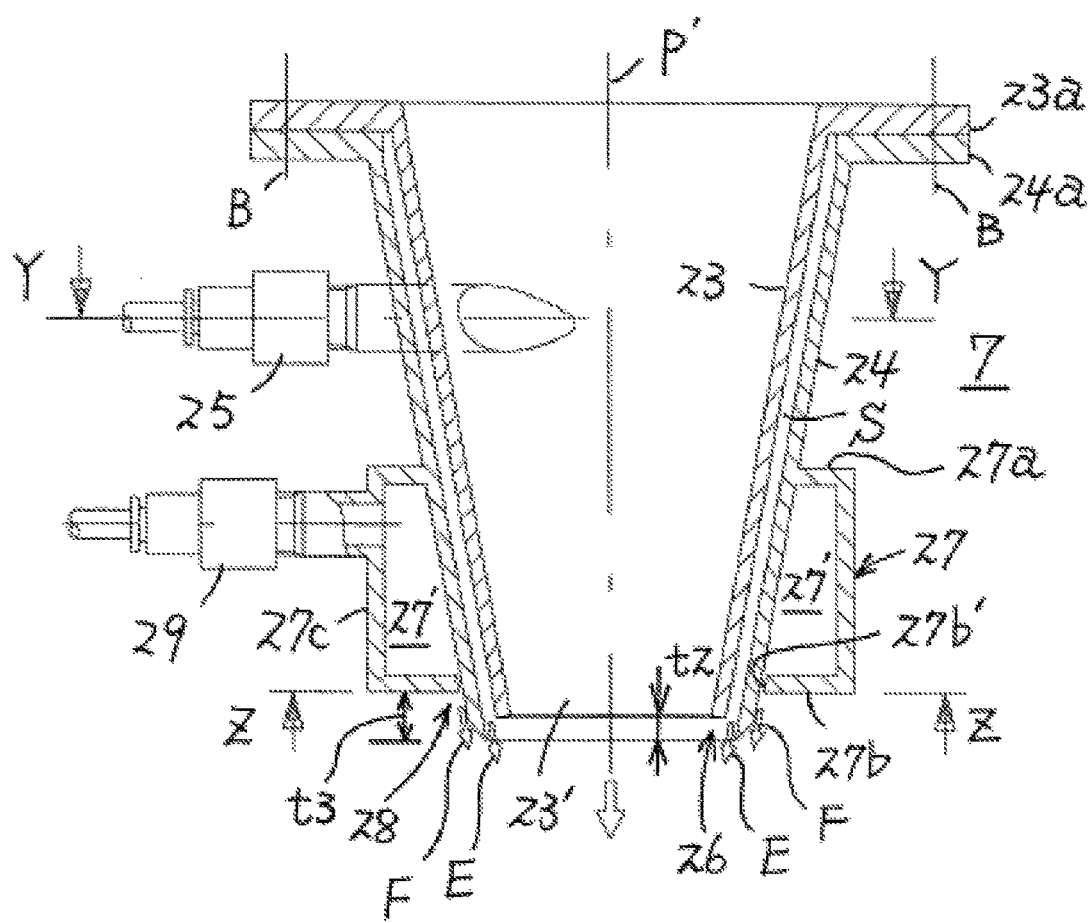
FIG. 4 is a sectional side view of the dew condensation prevention device for a discharge chute according to this invention.
Figure 6:
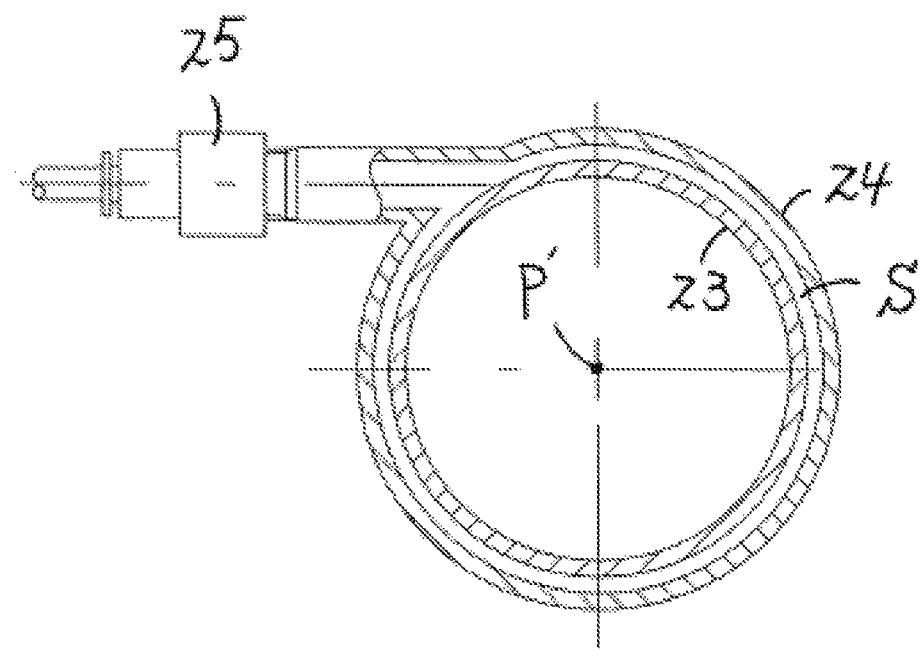
FIG. 6 is a Y-Y line sectional view of FIG. 4.

An external chute air input pipe 25 for introducing dry air into the space S is provided on an outer peripheral surface of the external chute 24 so as to penetrate the external chute 24 (see FIGS. 4 and 6). The air input pipe 25 is provided to be parallel to a horizontal direction tangent of the outer peripheral surface of the internal chute 23 or the external chute 24, and therefore the air introduced into the space S through the air input pipe 25 is ejected downward through the first air discharge port 26 while rotating spirally through the space S (see an arrow E in FIG. 4).

Furthermore, the lower end portion of the external chute 24 is positioned a distance t2 below the lower end portion of the internal chute 23. As a result, a downward direction flow of air is formed at all times near the outer periphery of the lower end portion of the internal chute 23, thereby making it impossible for dew condensation to form on or lumps of material to stick to the vicinity of the outer peripheral surface of the lower end portion of the internal chute 23.

Moreover, a cylindrical portion 27 that shares the central axis P' is provided on an outer peripheral surface of a lower half portion of the external chute 24 so as to surround the lower half portion, and an inner peripheral edge of an upper surface 27*a* of the cylindrical portion 27 is connected to the outer peripheral surface of the external chute 24 in an airtight state. An inner peripheral edge 27*b*' of a lower surface 27*b* of the cylindrical portion 27, meanwhile, is provided near the outer peripheral surface of the external chute 24 so as to form a second air discharge port 28 (see FIG. 7). An outer peripheral surface 27*c* of the cylindrical portion 27 is formed as a vertical surface that shares the central axis P', and as a result, an air reservoir 27' is formed in the interior of the cylindrical portion 27 as an annular space that surrounds the lower half portion of the external chute 24.

Furthermore, a cylindrical portion air input pipe 29 for introducing dry air into the interior of the cylindrical portion 27 is provided on the outer peripheral surface 27*c* of the cylindrical portion 27 so as to penetrate the outer peripheral surface 27*c*. The air input pipe 29 is provided to be orthogonal to a tangent of the outer peripheral surface 27*c* of the cylindrical portion 27, whereby the air introduced into the air reservoir 27' through the air input pipe 29 is introduced in two opposing directions (C and C' directions; see FIG. 7) traveling around the annular air reservoir 27'. Further, the dry air introduced into the air reservoir 27' is maintained at or above atmospheric pressure in the air reservoir 27' so that the air in the air reservoir is ejected forcefully, but evenly and with stability, downward through the second air discharge port 28 therebelow (see an arrow F in FIG. 4).

Furthermore, by introducing dry air into the air reservoir 27' through the air input pipe 29, the dry air is charged into the air reservoir 27' and then ejected through the second air discharge port 28, and therefore the dry air can be ejected through the second air discharge port 28 substantially evenly and with stability.

Figure 5:
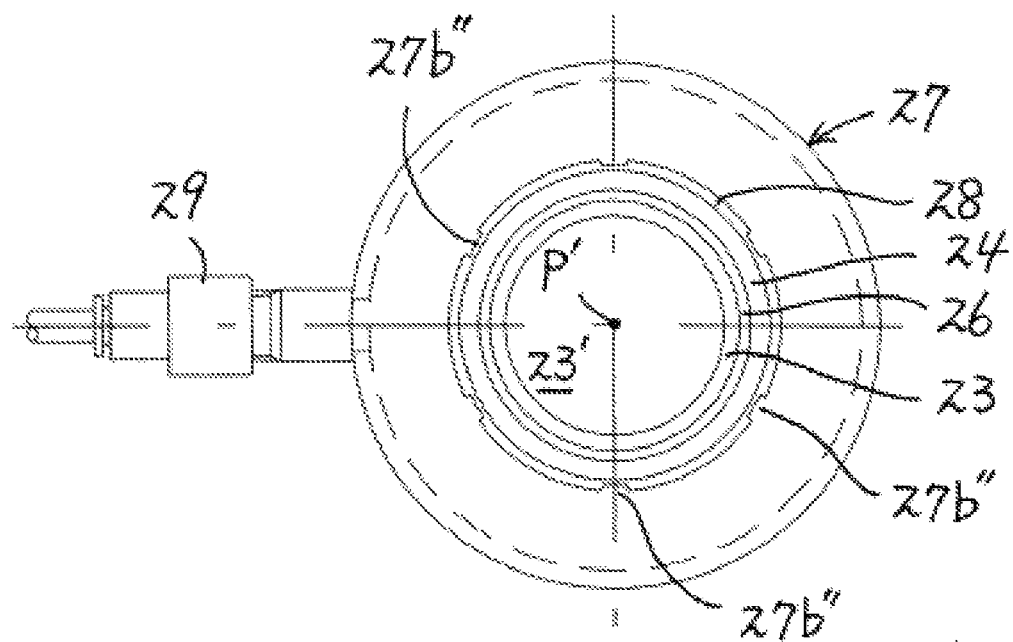
FIG. 5 is a bottom view of the dew condensation prevention device.
Figure 7:
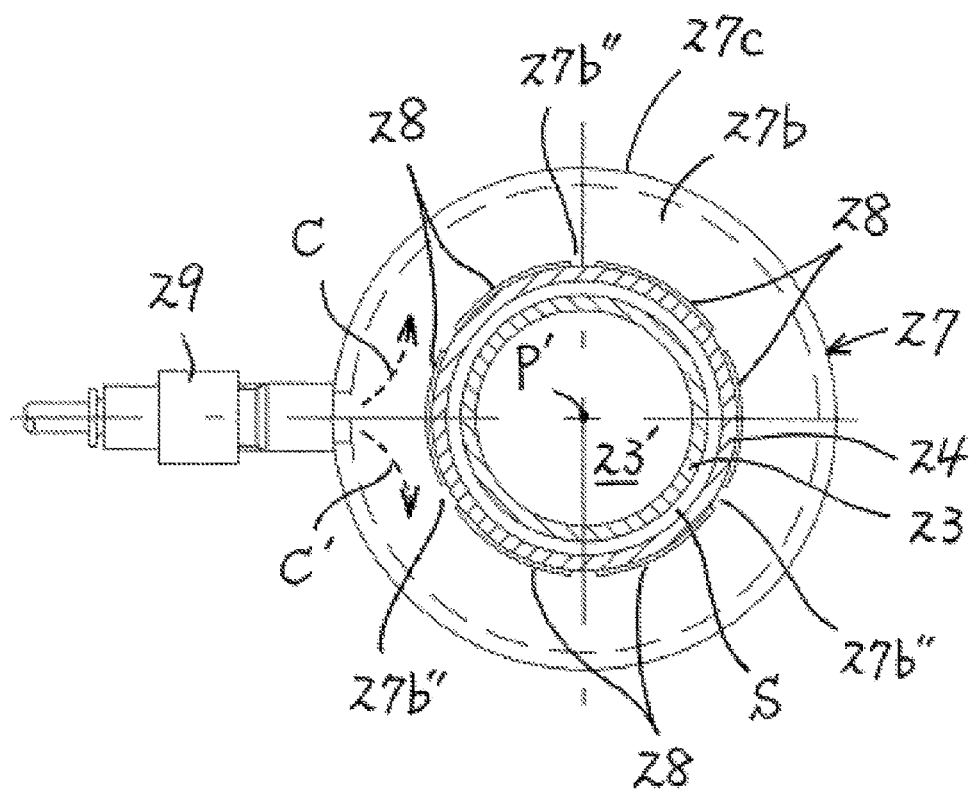
FIG. 7 is a Z-Z line sectional view of FIG. 4.

As shown in FIG. 5, six projections 27*b*'' projecting in a central direction are provided on an inner peripheral edge 27*b*' of the cylindrical portion 27 at fixed angular intervals (60 degree intervals according to this embodiment), and inner end portions of the respective projections 27*b*'' are connected to the outer peripheral surface of the external chute 24 (see FIGS. 5 and 7). Therefore, as shown in FIG. 7, the second air discharge port 28 is constituted by six arc-shaped slits formed on the lower end of the external chute 24 so as to extend around the outer peripheral surface thereof.

More specifically, the lower end of the internal chute 23 is formed to be slightly (by approximately t2=5 mm, for example) shorter than the lower end of the external chute 24 (see FIG. 4), and therefore the second air discharge port 28 is positioned further toward an upper side than the lower end position of the internal chute 23. A distance t3 from the lower end of the external chute 24 to the second air discharge port 28 is set at approximately 10 mm, for example. According to this configuration, lumps of particulate forming on the lower ends of the internal and external chutes 23, 24 can be removed effectively by the dry air ejected downward through the first air discharge port 26, while the dry air ejected downward through the second air discharge port 28 can effectively prevent dew condensation from forming on and lumps of particulate from sticking to the outer peripheral surface of the lower end portion of the external chute 24 (see the arrow F in FIG. 4).

Moreover, the plurality of projections 27*b*'' contact the outer peripheral surface of the external chute 24, and therefore a width of the second air discharge port 28, or in other words a clearance between the inner peripheral edge 27*b*' of the cylindrical portion 27 and the external chute 24, can be kept constant.

Hence, the second air discharge port 28 is provided in a slightly (by the distance t3) higher position than the lower end of the external chute 24. Accordingly, an air flow is formed downward from the second air discharge port 28, and as a result, it is possible to prevent dew condensation from forming on or lumps of raw material from sticking to the vicinity of the outer peripheral surface of the lower end of the external chute 24. Hence, in the cylindrical portion 27 part, the tip end portion 7 of the discharge chute has a triplex structure including the internal chute 23, the external chute 24, and the cylindrical portion 27.

A main valve 31 for feeding the dry air is provided on the outer side of one side face of the housing 6, and a pipe 32 connected to the valve 31 is introduced into the housing 6 and connected to two three-way branch pipes 34, 35 via an air pressure gauge 33 provided in the housing 6. An output pipe 36 connected to one output portion of the three-way branch pipe 34 is connected to the air input pipe 29, a pipe 37 connected to one output portion of the three-way branch pipe 35 is connected to the air input pipe 25, a pipe 38 connected to another output portion of the three-way branch pipe 35 is connected to the air input pipe 19, and a part of the pipe 38 is connected to the air input pipe 3 in the upper tube 2a of the hopper 2.

Further, the main valve 31 is connected to a dry air compressor 39, and when dry air is fed from the compressor 39 and the main valve 31 is opened, the dry air is introduced into the cylindrical portion 27 through the pipe 32, the three-way branch pipe 34, and the pipe 36, introduced into the space S in the tip end portion 7 of the discharge chute through the three-way branch pipe 35 and the pipe 37, introduced into the annular passage 13 of the particulate feeder 5 through the pipe 38, and introduced into the hopper 2 from the air input pipe 3 in the upper portion of the hopper 2 through the pipe 38.

Furthermore, in FIG. 1, an upper lid 43 capable of tightly closing the hopper 2 is provided on the hopper 2, a maintenance lid 44 that can be tightly closed is provided on the outer tube 9 of the particulate feeder 5, and a maintenance lid 45 that can be tightly closed is provided on the housing 6.

As is evident from FIGS. 1 and 2, the particulate feeding device 1 according to this invention has a completely airtight structure in which no outside air flows into a particulate flow passage extending from the hopper 2 to the particulate feeder 5 (the hopper 2, the interior of the particulate feeder 5, the cylindrical chute 18', and the tip end portion 7 of the discharge chute) before the particulate reaches the opening 23' of the discharge chute tip end portion 7, or in other words before the particulate passes through the hopper 2, the particulate feeder 5, and the discharge chute tip end portion 7. By feeding dry air into the particulate feeding device 1 having this airtight structure, dew condensation can be prevented from forming on the lower end portion of the discharge chute, and lumps of particulate raw material formed when the particulate raw material absorbs moisture can be prevented from sticking thereto, using a minimum amount of dry air.

An operation of this invention, having the above configuration, will now be described. As shown in FIG. 8, the housing 6 is assumed to be disposed on the upper surface plate 21 of the flocculant dissolving tank 20.

In this state, it is assumed that the flocculant (the drug) R, which is constituted by hygroscopic, deliquescent particulate, is stored in the hopper 2, and that the flocculant R travels through the inner tube 8 of the particulate feeder 5 therebelow so as to flow out into the annular passage 13 from the lower end portion of the inner tube 8 (or the lower end portion of the adjustment ring 12) at the predetermined angle of repose θ.

In this state, dry air is fed continuously into the pipes in the housing 6 from the compressor via the open/close valve 31. As a result, the dry air passes through the air pressure gauge 33 so as to be introduced into the cylindrical portion 27 of the discharge chute tip end portion 7 from the air input pipe 29 through the three-way branch pipe 34 and the pipe 36, and is simultaneously introduced into the space S from the air input pipe 25 through the three-way branch pipe 35 and the pipe 37.

At the same time, the dry air is fed into the annular passage 13 of the particulate feeder 5 through the three-way branch pipe 35 and the pipe 38 by the air input pipe 19, and introduced into the hopper 2 from the upper portion of the hopper 2 through the pipe 38 by the air input pipe 3.

Next, the motor M is driven to rotate the rotary blades 14 of the particulate feeder 5 in the direction of the arrow A. As a result, the flocculant flowing out into the annular passage 13 is conveyed in the direction of the arrow A by the rotation, in the direction of the arrow A, of the pawls 16 and the rotary blades 14 in the passage 13, whereby the flocculant is fed downward in a fixed amount through the discharge opening 17 in the annular passage 13.

The flocculant R that falls through the discharge opening 17 falls through the discharge chute 18, advances to the inverted truncated cone-shaped tip end portion 7 of the discharge chute, and falls through the internal chute 23 of the chute tip end portion 7 so as to be fed downward through the lower end opening 23'.

As shown in FIG. 8, the flocculant that falls through the opening 23' falls into the agitated water 22 in the dissolving tank 20 therebelow. After being agitated by an agitator 40, the dissolved flocculant advances into a fully dissolved liquid storage tank 42 via a partition plate 41.

In this environment, the humidity in the housing 6 is high. Therefore, dew condensation water is likely to stick to the lower end of the internal chute 23 of the discharge chute tip end portion 7, and the flocculant R is likely to absorb the dew condensation water so as to form lumps. However, the dry air is ejected constantly downward from the entire periphery of the annular first air discharge port 26 on the lower end of the discharge chute tip end portion 7, and therefore, even when dew condensation forms between the lower end of the internal chute 23 and the lower end of the external chute 24, the dew condensation can be blown away by the downwardly oriented dry air. Moreover, even when lumps of flocculant form in the same position, the lumps can be blown away by the downwardly oriented dry air, and therefore lumps of flocculant do not form in the interior of the lower end of the internal chute 23.

Dew condensation and lumps of flocculant also attempt to form on the outer peripheral portion of the lower end of the external chute 24, but dry air is blown downward from the second air discharge port 28 of the cylindrical portion 27 onto the lower end outer periphery of the external chute 24 so as to flow around the outer peripheral surface of the external chute 24, and therefore the dew condensation and lumps of flocculant can be blown downward. Furthermore, the air reservoir 27' is provided in the cylindrical portion 27, and the interior of the air reservoir 27' can be maintained at a high pressure. Therefore, even a small amount of dry air can be discharged forcefully and substantially evenly through the second air discharge port 28, and as a result, the formation of dew condensation and lumps of flocculant can be prevented efficiently.

Moreover, the dry air that is introduced into the particulate feeder 5 from the air input pipe 19 is introduced into the annular passage 13 in the directions of the arrows G and G' so as to flow through the annular passage 13, whereupon a part thereof passes through the cylindrical chute 18' and the discharge chute tip end portion 7 via the discharge port 17, and is discharged downward through the opening 23'. Hence, the dry air can be caused to flow constantly along a particulate movement path extending through the annular passage 13 of the particulate feeder 5 and then from the discharge port 17 to the cylindrical chute 8' and the discharge chute tip end portion 7, and as a result, an inner surface of the internal chute 23, an inner surface of the cylindrical chute 18', an inner surface and an upper surface of the annular passage 13, and so on, for example, can be maintained in a state of low humidity by the flow of dry air.

The formation of dew condensation and lumps of flocculant resulting from the absorption of dew condensation by the flocculant can therefore be suppressed effectively in the particulate flow passage extending through the annular passage 13, the cylindrical chute 18', and the discharge chute tip end portion 7 of the particulate feeder 5.

The dry air is also introduced into the upper tube 2a of the hopper 2. Hence, the interior of the hopper 2 can be maintained in a state of low humidity at all times, and as a result, the formation of dew condensation can be suppressed in the hopper 2. It is therefore possible to effectively prevent lumps of flocculant from forming in response to the formation of dew condensation water in the hopper 2, and prevent the lumps from sticking to a hopper inner wall. The dry air is fed specifically to the upper portion of the hopper 2, and therefore the particulate can be prevented from absorbing moisture immediately after being loaded into the hopper 2.

Example

A feed test was conducted using the flocculant dissolving device shown in FIG. 8 and using the "flocculant R" as the particulate. The flocculant R was housed in the hopper 2, whereupon the particulate feeder 5 was driven such that the flocculant R was fed continuously downward into the agitated water 22 from the discharge chute tip end portion 7. At the same time, the agitator 40 in the dissolving tank 20 was rotated in order to agitate the agitated water 22, and after being agitated, the agitated water 22 was moved into the fully dissolved liquid storage tank 42.

During the feed operation described above, the compressor 39 was operated such that dry air was fed continuously to the air input pipes 25, 29 of the discharge chute tip end portion 7, the air input pipe 19 of the particulate feeder 5, and the air input pipe 3 of the hopper 2 at an air pressure, as measured by the air pressure gauge 33, of 0.66 MPa to 0.75 MPa and a flow rate of 10 L/min to 20 L/min (a flow velocity of 0.5 m/sec to 1.0 m/sec). An aperture of the discharge chute tip end portion 7 was set at 40 mm in diameter, and an aperture of the particulate feeder 5 was set at 200 mm in diameter.

An operation to feed the flocculant R was implemented continuously under the above conditions for approximately four hours. As a result, no dew condensation and no lumps of flocculant whatsoever were found to have stuck to the lower end of the discharge chute tip end portion 7 (the outer periphery of the lower end portion of the external chute 24 and the inner and outer peripheries of the lower end portion of the internal chute 23). It was therefore possible to completely prevent dew condensation and lumps of flocculant from sticking.

Likewise the interior of the annular passage 13 of the particulate feeder 5, no dew condensation and no lumps of flocculant whatsoever were found to have stuck to the inner surface of the annular passage. Further, no dew condensation and no lumps of flocculant whatsoever were found to have stuck to the inner surface of the upper portion of the hopper 2. It was therefore learned that by ejecting dry air into both the interior of the particulate feeder 5 and the interior of the hopper 2, dew condensation and lumps of flocculant formed as a result of dew condensation, moisture absorption, deliquescence, and so on can be effectively prevented from sticking to the respective inner surfaces of the particulate feeder 5 and the hopper 2.

According to this invention, as described above, it is possible to prevent dew condensation from forming in the vicinity of the lower end of the discharge chute tip end portion 7 and lumps of particulate material resulting from moisture absorption by the particulate material from sticking to the lower end portion of the discharge chute tip end portion 7 effectively using a minimum amount of dry air, without introducing outside air into the particulate feeding device.

Further, the dry air is ejected downward through the second air discharge port 28 from a slightly higher position than the lower end of the external chute 24, making it possible to effectively prevent dew condensation from forming on and lumps of particulate from sticking to the outer peripheral portion of the lower end of the external chute 24.

Furthermore, lumps of particulate forming on the lower ends of the internal and external chutes 23, 24 can be removed effectively by the dry air ejected downward through the first air discharge port 26. Moreover, the dry air ejected downward through the second air discharge port 28 can effectively prevent dew condensation from forming on or lumps of particulate from sticking to the outer peripheral surface of the lower end portion of the external chute 24.

Further, by introducing the dry air into the particulate feeder 5, the interior of the annular passage 13 can be maintained in a dry state at all times, thereby effectively suppressing the formation of lumps of particulate resulting from moisture absorption by the particulate in the annular passage 13. Furthermore, the dry air introduced into the annular passage 13 is discharged to the outside through the discharge port 17 via the discharge chute tip end portion 7, and therefore the interior of the internal chute 23 can be maintained in a dry state, whereby the formation of dew condensation or lumps of particulate in the inner peripheral portion near the lower end of the discharge chute tip end portion 7 can be effectively suppressed.

Moreover, by introducing the dry air into the hopper 2, lumps of particulate formed in the hopper 2 when the particulate absorbs moisture and so on can be effectively prevented from sticking to the hopper inner surface, for example.

Further, the dry air can be fed into the space S in the external chute 24, the air reservoir 27' in the cylindrical portion 27, the annular passage 13, and the hopper 2 using shared pipes, and therefore a pipe configuration can be simplified such that the formation of dew condensation and lumps of particulate resulting from water and moisture absorption can be prevented by means of a simple configuration.

Furthermore, a particulate feeding device that can effectively suppress the formation of dew condensation and lumps of flocculant can be realized in a flocculant dissolving device, in which the humidity is high such that dew condensation and lumps of flocculant form easily.

Note that in the embodiment described above, a flocculant is cited as the particulate, but the particulate is not limited to a flocculant, and another hygroscopic, deliquescent drug or particulate may be used instead.

INDUSTRIAL APPLICABILITY

The dew condensation prevention device for a discharge chute according to this invention is capable of preventing the formation of dew condensation and lumps of raw material resulting from moisture absorption and so on by the raw material even when used in a high-humidity environment, and can therefore be used widely as a flocculant dissolving device, for example, or another particulate feeding device employed in a high-humidity environment.

REFERENCE SIGNS LIST

2 Hopper
3 Air input pipe for hopper
5 Particulate feeder
7 Tip end portion
8 Inner tube
9 Outer tube
11 Annular plate
13 Annular passage
14 Rotary blade
19 Air input pipe for outer tube
23 Internal chute
23' Opening
24 External chute
25 Air input pipe for external chute
26 First air discharge port
27 Cylindrical portion
27' Air reservoir
27b' Inner peripheral edge
28 Second air discharge port
29 Air input pipe for cylindrical portion
P Central axis

The invention claimed is:

1. A dew condensation prevention device for a discharge chute provided in a discharge port of a particulate feeder, the device comprising:
   a tip end portion of the discharge chute, the tip end portion having a duplex configuration including inverted truncated cone-shaped internal and external chutes;
   a space defined between an outer surface of the internal chute and an inner surface of the external chute;
   a first air discharge port communicating with the space and disposed between respective lower ends of the internal and external chutes;
   a cylindrical portion having an air reservoir in an interior thereof and configured to surround an outer peripheral surface of the external chute;
   a second air discharge port for communicating with the air reservoir, the second air discharge port being disposed between an inner peripheral edge of a lower surface of the cylindrical portion and the outer peripheral surface of the external chute and disposed at a higher position than that of the lower end of the external chute; and
   an external chute air input pipe and a cylindrical portion air input pipe for introducing dry air into the space and the air reservoir, respectively,
   wherein the external chute air input pipe and the cylindrical portion air input pipe are connected respectively to the outer peripheral surface of the external chute and the outer peripheral surface of the cylindrical portion.

2. The dew condensation prevention device according to claim 1, wherein the lower end of the internal chute is formed to be shorter than the lower end of the external chute, and
   the second air discharge port is positioned on an upper side of a lower end position of the internal chute.

3. A particulate feeding device employing the dew condensation prevention device according to claim 2, wherein:
   the particulate feeder includes an outer tube connected to a bottom plate, an inner tube that shares a central axis with the outer tube such that a lower end thereof is positioned at a predetermined distance above the bottom plate, and an annular tube disposed to close an upper end of the outer tube and an outer surface of the inner tube;
   a plurality of rotary blades extending over the bottom plate are provided about the central axis such that a tip end portion of each of the rotary blades is adjacent to an inner surface of the outer tube;
   a particulate fed into the inner tube flows out into an annular passage formed between the inner and outer tubes;
   the particulate in the annular passage is conveyed by the rotary blades to the discharge port that is provided in the bottom plate; and
   an outer tube air input pipe for introducing the dry air into the annular passage is connected to an outer peripheral surface of the outer tube.

4. The particulate feeding device according to claim 3, wherein the particulate feeding device is fixed on an upper surface plate of a dissolving tank of a flocculant dissolving device,
   an opening in a lower end of the discharge chute is disposed so as to be oriented downward toward a liquid in the dissolving tank, and
   the particulate is fed downward toward the dissolving tank through the discharge port.

5. The particulate feeding device according to claim 3, wherein a hopper configured to store the particulate is connected to an upper portion of the inner tube, and
   a hopper air input pipe for introducing the dry air into the hopper is connected to an outer peripheral surface of an upper portion of the hopper.

6. The particulate feeding device according to claim 5, further comprising pipes connected respectively to the external chute air input pipe, the cylindrical portion air input pipe, the outer tube air input pipe, and the hopper air input pipe, wherein the dry air is fed to the pipes via a compressor.

7. The particulate feeding device according to claim 6, wherein the particulate feeding device is fixed on an upper surface plate of a dissolving tank of a flocculant dissolving device,
   an opening in a lower end of the discharge chute is disposed so as to be oriented downward toward a liquid in the dissolving tank, and
   the particulate is fed downward toward the dissolving tank through the discharge port.

8. The particulate feeding device according to claim 5, wherein the particulate feeding device is fixed on an upper surface plate of a dissolving tank of a flocculant dissolving device,
   an opening in a lower end of the discharge chute is disposed so as to be oriented downward toward a liquid in the dissolving tank, and
   the particulate is fed downward toward the dissolving tank through the discharge port.

9. A particulate feeding device employing the dew condensation prevention device according to claim 1, wherein:
   the particulate feeder includes an outer tube connected to a bottom plate, an inner tube that shares a central axis with the outer tube such that a lower end thereof is positioned at a predetermined distance above the bottom plate, and an annular tube disposed to close an upper end of the outer tube and an outer surface of the inner tube;
   a plurality of rotary blades extending over the bottom plate are provided about the central axis such that a tip end portion of each of the rotary blades is adjacent to an inner surface of the outer tube;

a particulate fed into the inner tube flows out into an annular passage formed between the inner and outer tubes;

the particulate in the annular passage is conveyed by the rotary blades to the discharge port that is provided in the bottom plate; and an outer tube air input pipe for introducing the dry air into the annular passage is connected to an outer peripheral surface of the outer tube.

10. The particulate feeding device according to claim 9, wherein a hopper configured to store the particulate is connected to an upper portion of the inner tube, and a hopper air input pipe for introducing the dry air into the hopper is connected to an outer peripheral surface of an upper portion of the hopper.

11. The particulate feeding device according to claim 10, further comprising pipes connected respectively to the external chute air input pipe, the cylindrical portion air input pipe, the outer tube air input pipe, and the hopper air input pipe, wherein the dry air is fed to the pipes via a compressor.

12. The particulate feeding device according to claim 9, wherein the particulate feeding device is fixed on an upper surface plate of a dissolving tank of a flocculant dissolving device, an opening in a lower end of the discharge chute is disposed so as to be oriented downward toward a liquid in the dissolving tank, and the particulate is fed downward toward the dissolving tank through the discharge port.

* * * * *